F. O. SWANBURG.
DERRICK.
APPLICATION FILED FEB. 11, 1913.
1,164,679.
Patented Dec. 21, 1915.
2 SHEETS—SHEET 1.
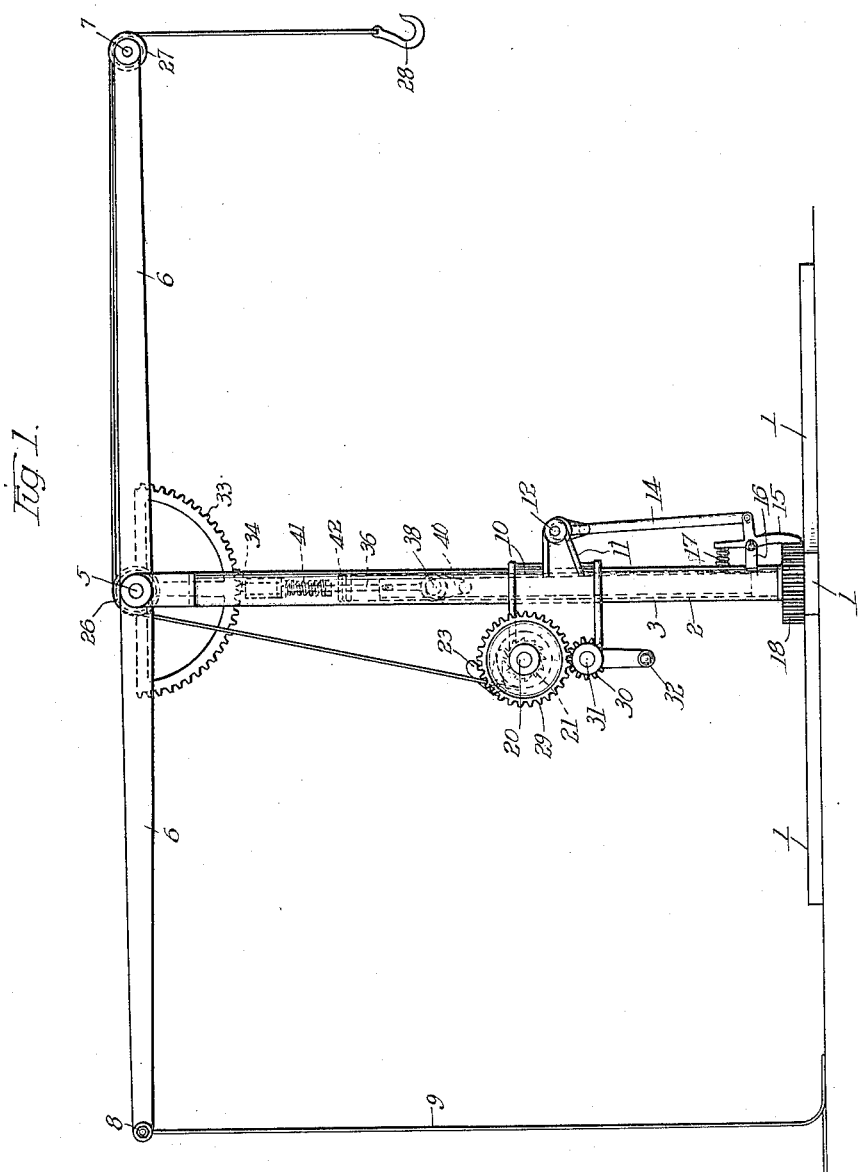

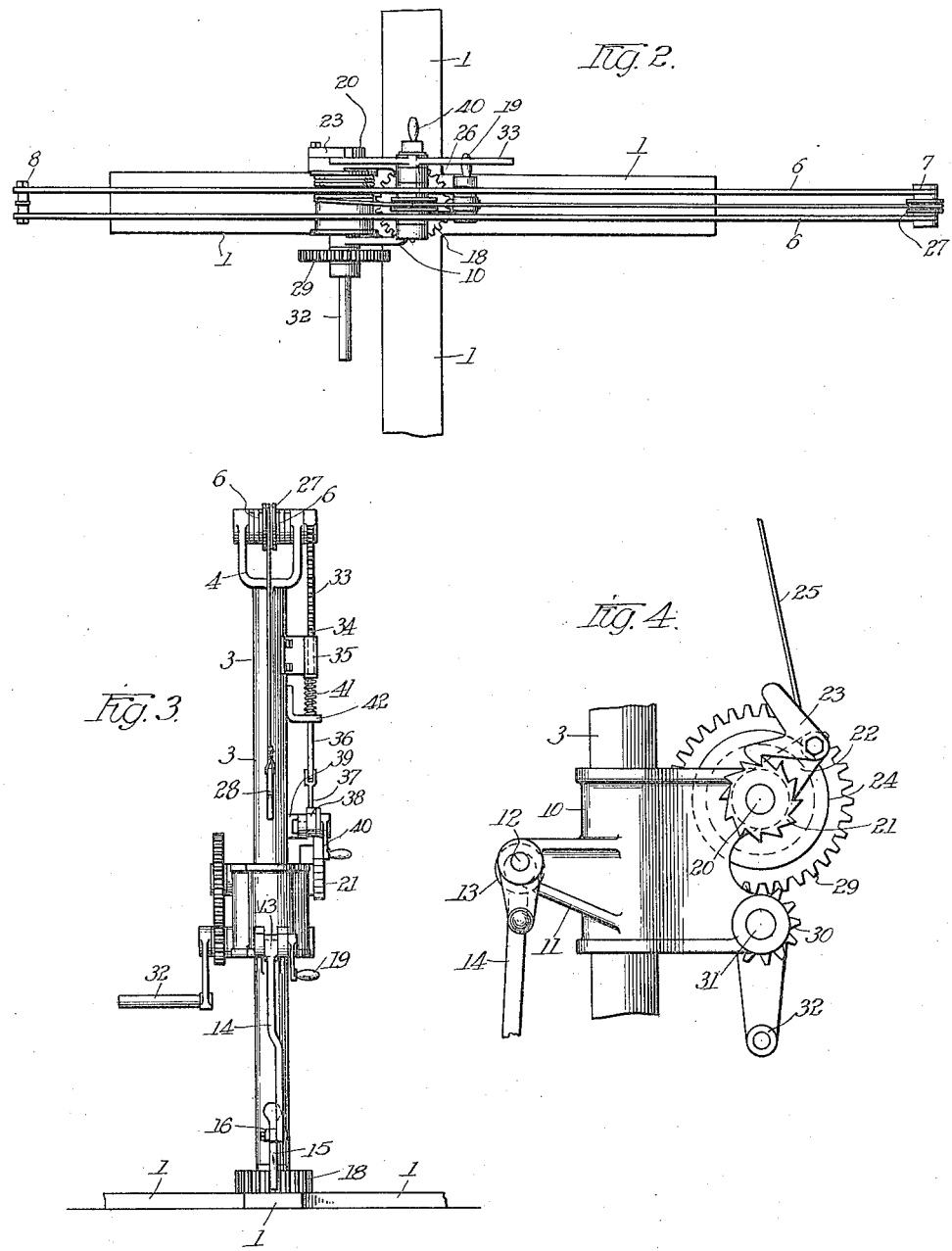

UNITED STATES PATENT OFFICE.

FRITS O. SWANBURG, OF EVANSTON, ILLINOIS.

DERRICK.

1,164,679.

Specification of Letters Patent.

Patented Dec. 21, 1915.

Application filed February 11, 1913. Serial No. 747,636.

*To all whom it may concern:*

Be it known that I, FRITS O. SWANBURG, a citizen of the United States, residing at Evanston, in the county of Cook and State of Illinois, have invented certain new and useful Improvements in Derricks, of which the following is a specification.

This invention relates to improvements in derricks and its object is to produce a device of this class that is simple in construction and operation and cheap to manufacture.

With the foregoing and other objects in view the invention consists in the combination and arrangement of parts to be hereinafter fully described in the following specification, pointed out in the claim and illustrated in the accompanying drawings which form a part of said specification and in which—

Figure 1 is a side elevation of my improved derrick. Fig. 2 is a plan. Fig. 3 is an end elevation. Fig. 4 is a detail of a portion of the mechanism in side elevation.

Like reference characters indicate corresponding parts throughout the several views.

1 is the base of my derrick to which a vertical post or upright 2 is secured upon which a rotary shell 3 is disposed that carries a U-shaped bearing 4 at its upper termination wherein a transverse shaft or pivot 5 is journaled that carries pivotally the twin beams 6, 6 which are connected at one end by a shaft or link 7 and at the other end by a link 8. To the link 8 one end of a cable 9 is secured that may be used to oscillate or rotate the beams 6, 6 in a horizontal plane, the same operation serving to move the shell 3.

Upon the shell 3 a bearing 10 is secured that is formed with a projection 11 in which a pin 12 is journaled that carries an eccentric 13 having an arm 14 connected at its opposite extremity to a dog 15 which is pivotally carried by a lug 16 secured to the shell; one end of said dog being secured to a spring 17 made fast to the shell while the free extremity of said dog is adapted for locking engagement with the teeth of a circular rack 18 made fast to the base 1 of the derrick and encircling the base of the shell 3. The pin 12 is oscillated by means of a handle 19 whereby the dog 15 may be forced out of or into engagement with the rack 18 permitting or effectually resisting oscillation or rotation of the shell 3. The bearing 10 is further provided with a pin 20 upon which a ratchet 21 is secured and said pin also carries a lug 22 upon which a locking dog 23 is pivoted for engagement with said ratchet to permit its rotation in one direction only, but which dog may be manually raised out of engagement with said ratchet thereby permitting its rotation in the opposite direction. Upon the pin 20 a drum 24 is also mounted about which a cable 25 is disposed that passes over a pulley 26 disposed upon pivot 5 and also over a pulley 27 mounted upon the shaft 7 at one end of the twin arms 6, 6 and a hook 28 is carried at the end of said cable. 29 is a large gear wheel also mounted upon the pin 20 in mesh with a cog 30 disposed upon an axis 31 also journaled in the bearing 10 and said pin 31 is oscillated or rotated by means of a crank 32 carried thereby.

33 is a segment made fast to the shaft 5 and said segment is adapted to be engaged by a dog 34 disposed or operable in a guide-bracket 35 secured to the shell 3, said dog being carried at one end of a rod 36 entering said guide-bracket and connected at its opposite end to a bifurcated link 37 carried by an eccentric 38 disposed upon a pin journaled in a bracket 39 carried by the shell 3, said pin and eccentric being oscillated or rotated by a crank 40; upon the body of the rod 36 a spring 41 is disposed that at one extremity rests upon a bracket 42 and at the other against a lug carried upon the said rod. Normally the said spring will keep the dog 34 in engagement with the segment 33 locking the same against oscillation but should it be desired to oscillate the said segment and its shaft 5 with the twin beams 6, 6 the crank 40 will be oscillated until the eccentric 38 withdraws the dog 34 from engagement with the segment when a pull upon the cable 9 will oscillate said shaft 5 in one direction or a pull upon the hook 28 will oscillate it in the other direction; by means of the crank 40 the dog 34 may again be thrown into engagement with the segment 33 locking the mechanism in the adjusted position.

What is claimed is:—

In a derrick comprising a base and an upright arranged thereupon, a rotary shell encircling said upright, an annular rack carried by said base, an eccentric adapted to rotate with said shell, a pivotally supported latch carried by and rotative with said shell and adapted for locking engagement with said rack, connection between said latch and the said eccentric and a handle for said eccentric whereby the same may be actuated to move said latch into or out of engagement with the said rack.

In testimony that I claim the foregoing as my own I have hereto affixed my signature in the presence of two subscribing witnesses.

FRITS O. SWANBURG.

Witnesses:
LEONA V. DAUGHTRY,
FRANK L. CRILLY.

Copies of this patent may be obtained for five cents each, by addressing the "Commissioner of Patents, Washington, D. C."